US011009313B2

(12) United States Patent
DiBlasio et al.

(10) Patent No.: US 11,009,313 B2
(45) Date of Patent: May 18, 2021

(54) VALVE SYSTEM FOR AIR GUN

(71) Applicant: Umarex USA, Inc., Fort Smith, AR (US)

(72) Inventors: Alexander Robert DiBlasio, Jamison, PA (US); Ben Noji, Landenberg, PA (US); Ross James Jutras, Newark, DE (US); Stephen J. Hague, Newark, DE (US)

(73) Assignee: UMAREX USA, INC., Fort Smith, AR (US)

( * ) Notice: Subject to any disclaimer, the term of this patent is extended or adjusted under 35 U.S.C. 154(b) by 802 days.

(21) Appl. No.: 15/866,240

(22) Filed: Jan. 9, 2018

(65) Prior Publication Data

US 2018/0195831 A1    Jul. 12, 2018

Related U.S. Application Data

(60) Provisional application No. 62/445,170, filed on Jan. 11, 2017.

(51) Int. Cl.
| *F41B 11/723* | (2013.01) |
| *F16K 31/44* | (2006.01) |
| *F16K 1/12* | (2006.01) |
| *F16K 31/383* | (2006.01) |

(52) U.S. Cl.
CPC ............. *F41B 11/723* (2013.01); *F16K 1/12* (2013.01); *F16K 31/383* (2013.01); *F16K 31/44* (2013.01)

(58) Field of Classification Search
CPC ......... F41B 11/00; F41B 11/72; F41B 11/723; F41B 11/73; F16K 1/12; F16K 31/383; F16K 31/44
See application file for complete search history.

(56) References Cited

U.S. PATENT DOCUMENTS

| 8,322,329 B1* | 12/2012 | Sikes | F41B 11/723 |
| | | | 124/73 |
| 8,485,172 B2* | 7/2013 | Tseng | F41B 11/62 |
| | | | 124/73 |
| 8,651,096 B2* | 2/2014 | Sikes | F41B 11/723 |
| | | | 124/73 |
| 9,033,306 B2* | 5/2015 | Kunau | B60C 25/145 |
| | | | 251/44 |
| 9,080,832 B2* | 7/2015 | Brahler, II | F41B 11/723 |
| 9,605,924 B1* | 3/2017 | McCaslin | F41B 11/62 |
| 10,598,461 B2* | 3/2020 | Lort | F41B 11/73 |
| 2013/0104868 A1* | 5/2013 | Sikes | F41B 11/723 |
| | | | 124/77 |
| 2017/0299322 A1* | 10/2017 | Lort | F17C 7/04 |
| 2018/0180377 A1* | 6/2018 | Lort | F41B 11/62 |
| 2020/0025511 A1* | 1/2020 | Cherry | F41B 11/723 |

* cited by examiner

*Primary Examiner* — Benjamin P Lee
(74) *Attorney, Agent, or Firm* — Eric B. Fugett; Mark A. Pitchford; Pitchford Fugett, PLLC

(57) ABSTRACT

A valve system utilizes a main valve body with a restricted diameter conduit communicating between a propulsion chamber and rear cavity and a smaller venting valve mechanically actuated to open the rear cavity to atmosphere, thereby causing the main valve body to open to pass pressurized air in the propulsion chamber to an orifice to power a projectile.

20 Claims, 4 Drawing Sheets

VALVE SYSTEM FOR AIR GUN

FIELD OF INVENTION

This invention relates to air rifles using compressed air to explosively fire a projectile through a barrel. In even greater particularity, the present invention relates to a valve assembly that provides compressed air to the exit orifice behind the projectile to force the projectile through the barrel. In still further particularity the present invention relates to a valve system that matches the volume of air delivery to the orifice size while reducing the valve opening force necessary to launch the projectile.

BACKGROUND

All known prior art large caliber pneumatic launching devices need to have a firing valve as big as the caliber of the round to be as effective as possible with respect to flow. Consequently, large opening forces are required to open the valve and fire the projectile. Our unique valve system allows for much smaller opening forces relative to the caliber of the round being fired.

BRIEF DESCRIPTION OF THE DRAWINGS

Referring to the drawings which are appended hereto and which form a portion of this disclosure, it may be seen that.

DETAILED DESCRIPTION

One or more of the above objects can be achieved, at least in part, by providing a valve system which delivers air in a capacity matching the possible flow out of the system without requiring the force to open a sealing face as large as the caliber of the projectile.

Figure 1:
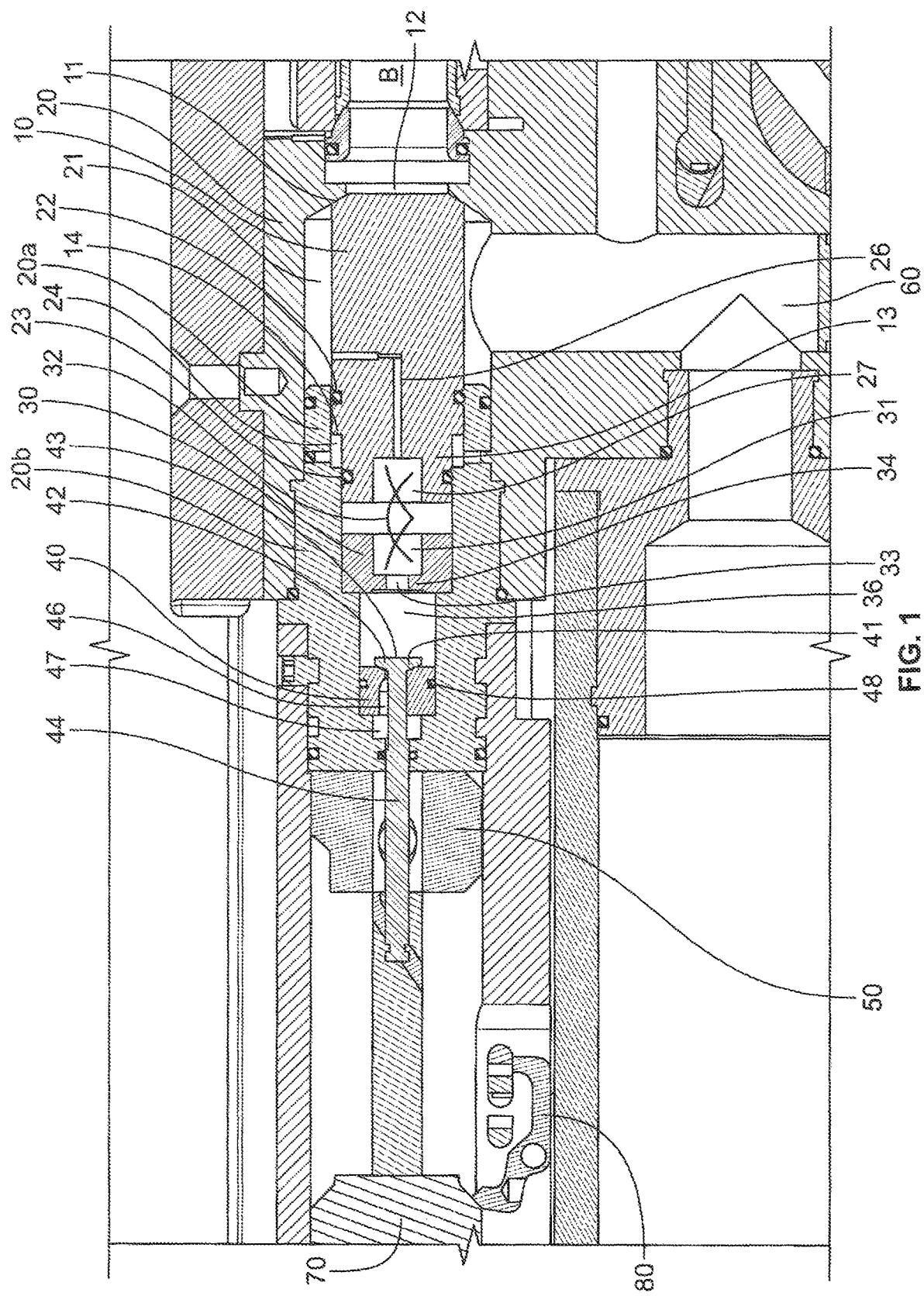
FIG. 1 shows the valve mechanism with all valves seated and closed.
Figure 2:
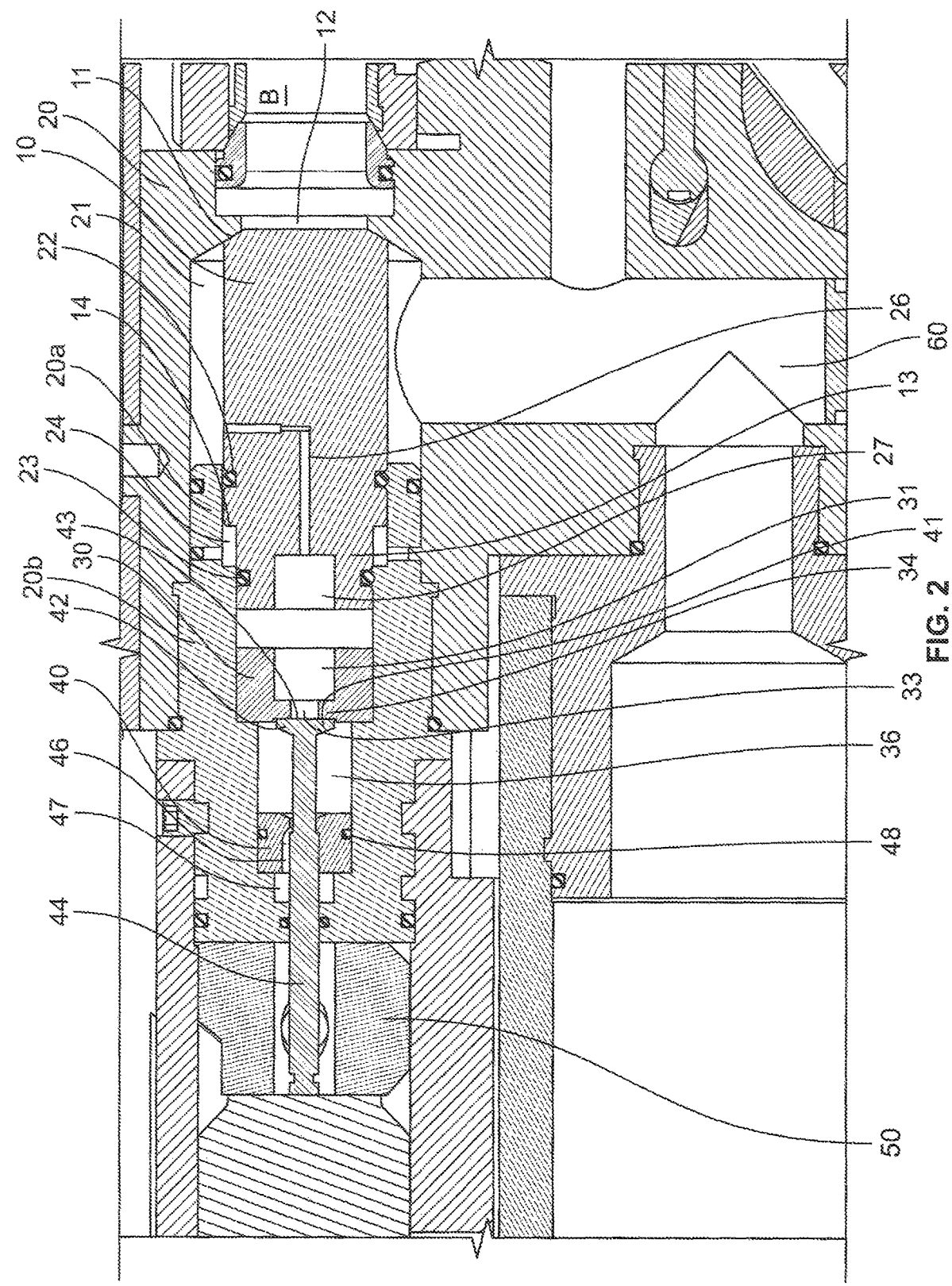
FIG. 2 shows the valve mechanism as the hammer is activated.
Figure 3:
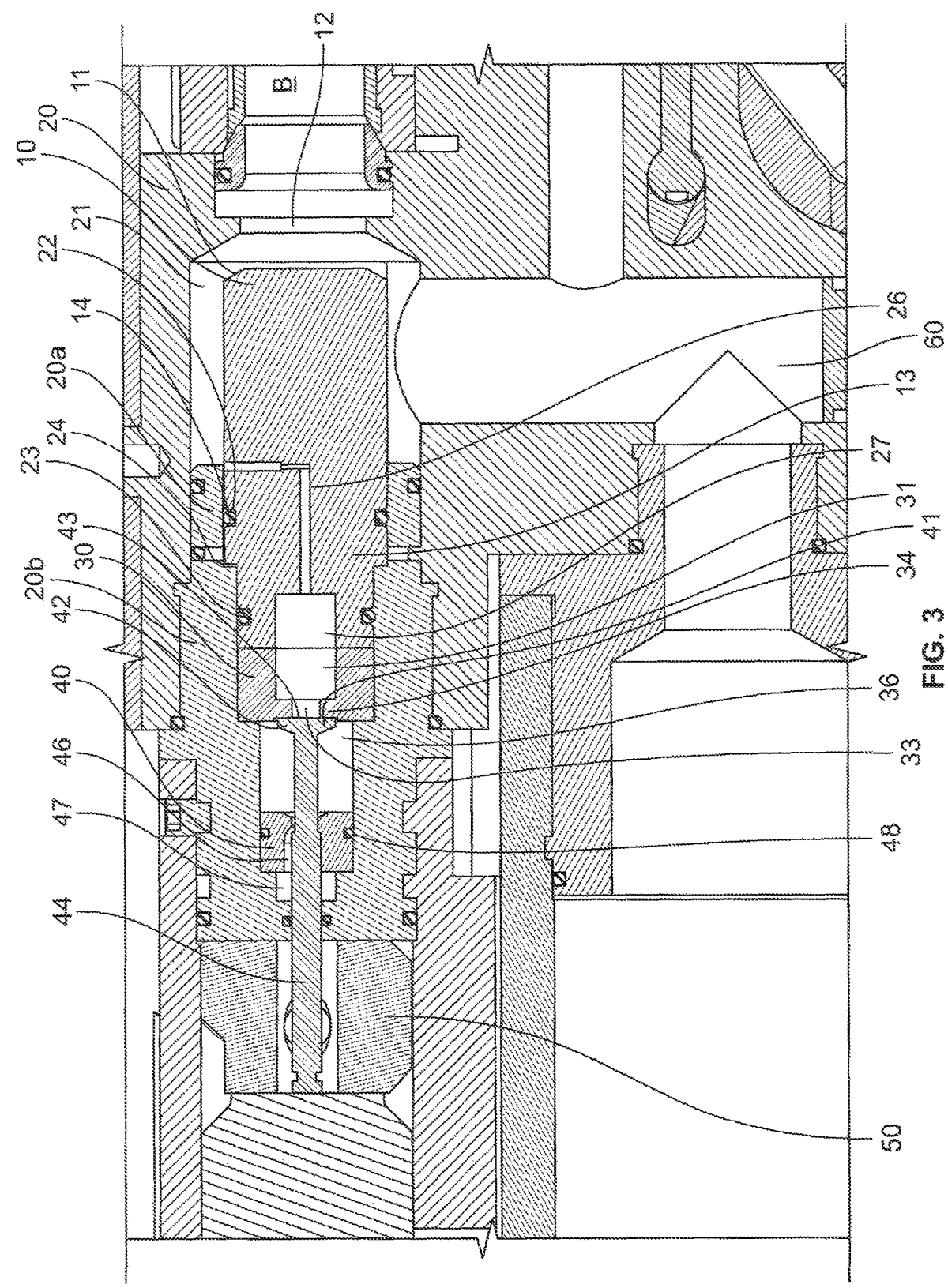
FIG. 3 show the valve mechanism with the valves actuated by the hammer.
Figure 4:
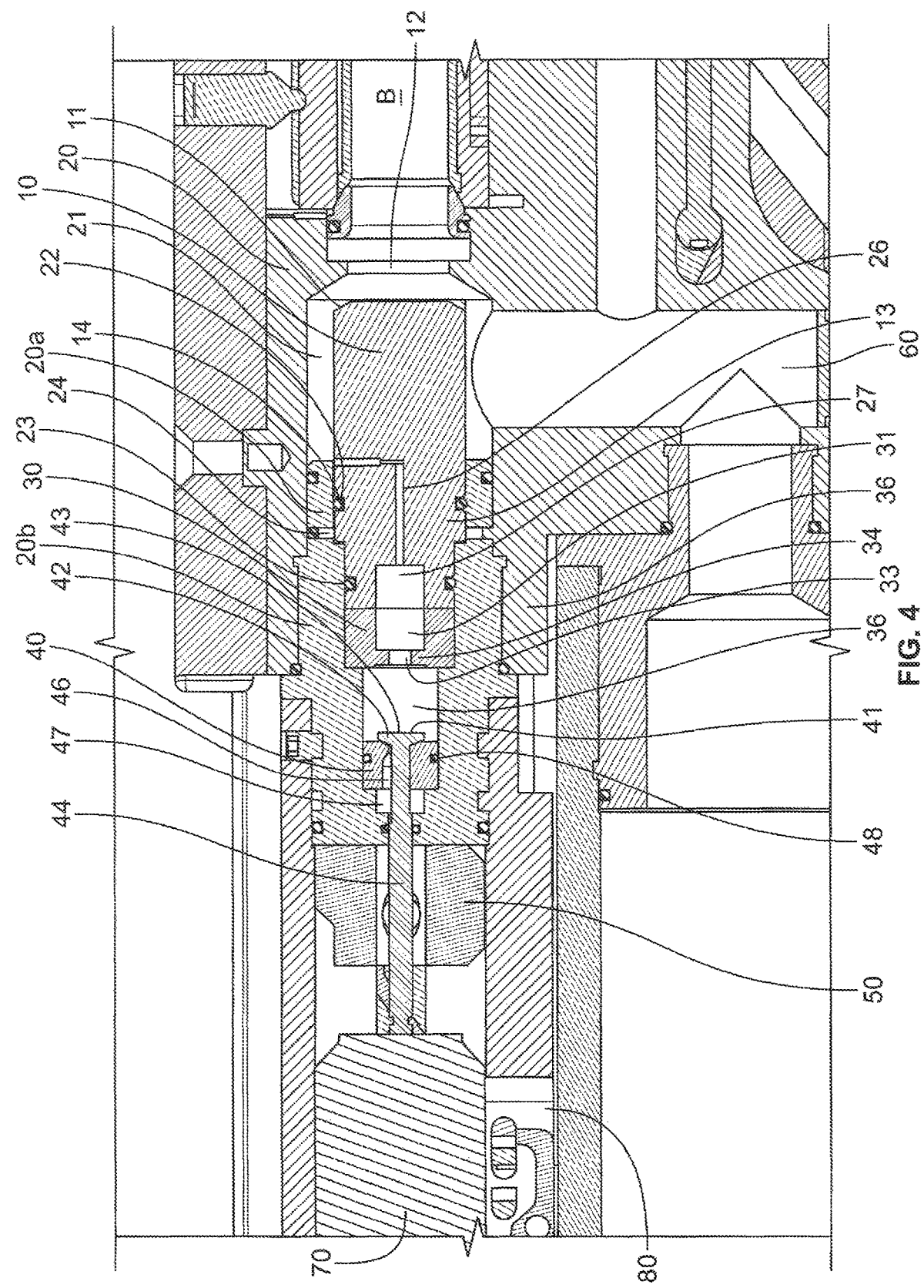
FIG. 4 shows the valve mechanism after firing.

Referring to FIG. 1, note valve housing assembly 20 contains a cylindrical main valve body 10 which has an annular tapered front seal face 11 designed to be larger in diameter than that of the final orifice 12 of the system to the barrel B. Main valve body 10 is designed to open far enough for the air supply from a high pressure source to be delivered faster than the air can be used for propulsion of the projectile. The main valve 10 is able to achieve its size without compromising the effort to open the valve due to the operation required to open the valve.

As noted in FIGS. 1 to 4, main valve body 10 is housed within a stepped cavity formed by housing assembly 20. At the forward end of the main valve body 10, housing assembly 20 has an inner diameter greater than the diameter of main valve body 10 thus forming a propulsion chamber 21 about the body. Cylindrical main valve body 10 is formed with a stepped rear portion 13 defining a shoulder 14. Cylindrical main valve body 10 carries a pair of O rings 22 and 23, with large O ring 22 carried forwardly of shoulder 14 and smaller O ring 23 carried rearwardly of the shoulder 14. The term O ring should be construed to include polymer based O rings made of any conventional material including rubber, silicone, or a blend thereof, as well as FEP encapsulated O rings, PTFE O rings, and flexible graphite O rings.

Cylindrical main valve body 10 is slidably carried in a first reduced diameter portion 20a of housing assembly 20 and a second reduced diameter portion 20b of housing assembly 20. Large O-ring 22 carried by main valve body 10 sealingly engages the first reduced diameter portion of housing assembly 20 forwardly of shoulder 14 and a smaller O-ring 23 is mounted to main valve body 10 such that shoulder 14 is positioned in between O rings 22 and 23. Consequently, a variable sized chamber 24 is formed between the main valve body 10 and the housing assembly. This chamber is vented through the housing assembly 20 to the atmosphere and sealed from the propulsion chamber 21 as well as the rear of the main valve body 10. It will be appreciated that gases within this variable sized chamber 24 being vented to the atmosphere provides no resistance to axial movement of main valve body 10, thus allowing the body to move freely within the housing assembly 20.

It will also be seen that the main valve body 10 has a rearwardly opening spring well 27 formed in the rear face of the body. A biasing spring 32 is mounted in the rearwardly opening spring well 27 and urges the main valve body 10 toward the valve seat 20a formed about final orifice 12. Thus, in its normally biased position, valve seal face 11 will abut valve seat 20a.

The main valve body 10 also has a restricted diameter conduit 26 extending from just forwardly of larger O ring 22 radially within main valve body 10 and then centrally to the rear of main valve body 10 terminating in the rearwardly opening spring well 27, thereby providing fluid communication between propulsion chamber 21 and rearwardly opening spring well 27. As will be seen hereinafter, this restricted conduit 26 gives the pressurized air the ability to be both the firing air and also be used to hold the valve closed in the normal operating conditions. The radial portion of restricted conduit 26 is positioned such that it communicates with the propulsion chamber 21 when main valve body 10 is in its forwardly biased position with valve seal face 11 abutting valve seat 20a. Also mounted within the second reduced diameter portion of housing assembly 20 rearwardly of main valve body 10 is wall portion 30 which has formed there within forwardly opening cooperative spring well 31. It to be understood that a biasing spring 32 is mounted within rearwardly opening spring well 27 and cooperative spring well 31 to bias main valve body 10 toward a forward or closed position.

To retract main valve body 10 and fire the projectile, the present valve system uses a much smaller valve as well, called the vent valve, to vent a chamber of air behind the main valve in order to open the main valve as will be described hereinafter. A venting orifice 33 extends from cooperative spring well 31 rearwardly to a first venting chamber 36 such that cooperative spring well 31 communicates through venting orifice 33 to venting chamber 36 formed within a fourth reduced diameter portion of housing assembly 20 between wall portion 30 and venting valve component 40, also mounted within fourth reduced diameter portion 20d of housing assembly 20. Valve component 40 has a valve seat 41 formed on its forward wall that mates with rear valve face 42 carried on poppet valve head 43 which is rearwardly spring biased such that the valve is normally closed at valve component 40. Poppet valve head 43 is carried on a valve stem 44 which extends through passage 46 in valve component 40. Venting chamber 36 communicates with an atmospherically vented chamber 47 vent via passage 46 when poppet valve head 43 is disengaged from valve seat 41. Venting valve seat component 40 carries an O ring 48 which seals between valve component 40 and the fourth reduced diameter portion of housing assembly 20.

Valve stem 44 is slidably carried by valve stem guide 50 mounted rearwardly of housing assembly 20 such that valve stem 44 extends rearwardly of valve stem guide 50 when the venting valve is biased in its normally closed position. Thus, it may be seen that with all of the valves in their normally biased or closed position propulsion chamber 21 communicates via restricted conduit 26 and venting orifice 33 with venting chamber 36. A pressurized gas supply 60 is connected to propulsion chamber 21, thus, with the valves in their normally closed position, propulsion chamber 21 and venting chamber 36 reach equilibrium with the pressure in each being the same and front seal face 11 is sealing urged against main valve seat 16 surrounding final orifice 12.

Mounted rearwardly of the valve stem guide 50 is a hammer 70 connected to a trigger mechanism 80 and biased toward impact with valve stem 44. When the trigger mechanism 80 is pulled, the hammer 70 moves forwardly and unseats the valve head 43 from valve seat 41, immediately venting the pressurized gas in venting chamber 36 to atmosphere and creating a large pressure differential across main valve body 10. Because restricted conduit 26 is much smaller than venting orifice 33 pressurized gas from the propulsion chamber 21 cannot fill the volume of the venting chamber 36 before the pressure differential across large O-ring 22 causes the valve body to move rearwardly, thereby opening final orifice 12 to allow the pressurized gas to propel the projectile. In other words, to open the venting valve, a mechanically actuated hammer 70 is used to strike the valve stem 44. Once the vent valve is open the air behind the main valve body 10 can be vented to atmosphere and the pressure and flow of the air in front of the main valve body 10 will force it to open all of the way and remain open until the vent valve has closed. This releases pressurized gas through the front orifice 12 and propels the pellet or other projectile through the barrel.

It will have been noted that in combination with the vent valve, the main valve utilizes three different sealing surfaces which gives the system the ability to close and open the main valve with much less force than a normal valve of this size would require; in addition to the three different sealing diameters, the main valve features a chamber 24 connected to atmosphere in the middle of the two O-rings 22 & 23. The atmospheric chamber 24 between the O-rings is essential to give the main valve the ability use any size of rearward chamber compared to any size of propulsion chamber. This feature makes this valve modular and we have disclosed a relationship that can be used for any caliber of pneumatic launching device if you scale the size of the valve according to the needs of the system. This valve system supplies a need that is crucial to the effectiveness of pneumatic launching devices. All known prior art large caliber pneumatic launching devices need to have a firing valve as big as the caliber of the round to be as effective as possible with respect to flow.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What we claim is:

1. A valve system for releasing air to power a projectile in an air gun, the valve system comprising:
    a valve body including a forward seal surface, a large diameter forward section, a reduced diameter rear section, a first O ring carried by said large diameter forward section, a second O ring carried by said reduced diameter rear section, a restricted diameter air conduit extending radially into said large diameter section forward of said first O ring and axially rearwardly providing a passageway through said valve body;
    a housing surrounding said valve body, said housing including a first portion surrounding said large diameter forward section and sealingly engaging said first O ring, a second portion surrounding said reduced diameter rear section and sealingly engaging said second O ring such that a variable volume chamber is formed between said first and second O rings, said valve body and said housing, with said variable volume chamber being vented to atmosphere, said housing further including an enlarged portion forward of said first portion defining a propulsion chamber about said valve body and a forward valve seat for engagement with said forward seal surface such that pressurized air may be confined between said valve body and said enlarged portion when said valve seat is engaged with said forward seal surface,
    said housing defining a venting chamber rearwardly of said large diameter valve body, said venting chamber communicating with said restricted diameter air conduit to receive pressurized air therethrough from said propulsion chamber;
    a mechanically actuated small diameter valve operatively connected to said venting chamber for selective release of pressurized air within said venting chamber to atmosphere; and
    a biasing spring operatively positioned to urge said valve body forwardly against said valve seat.

2. The valve system of claim 1, further comprising an inlet to said propulsion chamber for selective admission of pressurized air into said propulsion chamber.

3. The valve system of claim 1, wherein said valve seat circumscribes an outlet to a barrel of said air gun such that retraction of said valve body releases pressurized air into said barrel.

4. The valve system of claim 1, further comprising a spring well formed in a rear surface of said valve body for retaining said biasing spring therein.

5. The valve system of claim 4, wherein said second portion of said housing surrounds an internal wall forming a forward wall of said venting chamber, said internal wall having a second spring well therein aligned with said spring well in said rear surface of said valve body for retaining said biasing spring therein, said internal wall also defining an aperture providing communication between said venting chamber and said second spring well and having a diameter less than said second spring well.

6. The valve system of claim 5, wherein said small diameter valve includes a poppet valve stem and head mounted for movement between a position abutting said forward wall and covering said aperture, and a position closing an orifice connecting said venting chamber to atmosphere, said poppet valve stem normally biased to close said orifice.

7. The valve system of claim 6, further comprising a trigger actuated hammer biased toward said poppet valve stem such that actuation of said hammer moves said poppet valve stem and head from a position closing said orifice to a position abutting said forward wall.

8. The valve system of claim 7, wherein said valve seat circumscribes an outlet to a barrel of said air gun such that actuation of said hammer opens said orifice creating a pressure differential across said valve body and retraction of said valve body to release pressurized air into said barrel.

9. A valve system for releasing air to power a projectile in an air gun, the valve system comprising:
    a main valve body including a forward seal surface, a large diameter forward section, a reduced diameter rear section, a restricted diameter air conduit extending radially into said large diameter section and axially rearwardly providing a passageway through said main valve body;
    a housing slidably receiving and surrounding said main valve body, said housing including a first portion surrounding and sealingly engaging said large diameter forward section, a second portion surrounding said reduced diameter rear section and sealingly engaging said reduced diameter rear section such that a variable volume chamber is formed about said reduced diameter rear section of said main valve body and said housing, with said variable volume chamber being vented to atmosphere, said housing further including an enlarged portion forward of said first portion defining a propulsion chamber about said main valve body and a forward valve seat for engagement with said forward seal surface such that pressurized air may be confined between said main valve body and said enlarged portion when said valve seat is engaged with said forward seal surface,
    said housing defining a venting chamber rearwardly of said main valve body, said venting chamber communicating with said restricted diameter air conduit to receive pressurized air therethrough from said propulsion chamber, chamber;
    a small diameter valve operatively connected to said venting chamber for selective release of pressurized air within said venting chamber to atmosphere; and
    a biasing spring operatively positioned to urge said main valve body forwardly against said valve seat.

10. The valve system of claim 9, further comprising sealing rings disposed about said large diameter forward section and said reduced diameter rear section to define said variable volume chamber.

11. The valve system of claim 9, wherein said small diameter valve includes a poppet valve stem and head, said poppet valve stem and head normally biased to close an orifice connecting said venting chamber to atmosphere.

12. The valve system of claim 11, further comprising a trigger actuated hammer biased toward said poppet valve stem such that actuation of said hammer moves said poppet valve stem and head from a position closing said orifice to a position opening said orifice.

13. The valve system of claim 12, wherein said valve seat circumscribes an outlet to a barrel of said air gun such that actuation of said hammer opens said orifice creating a pressure differential across said valve body and retraction of said valve body to release pressurized air into said barrel.

14. The valve system of claim 11, wherein said valve seat circumscribes an outlet to a barrel of said air gun such that actuation of said poppet valve stem opens said orifice creating a pressure differential across said valve body and retraction of said valve body to release pressurized air into said barrel.

15. The valve system of claim 14, further comprising a trigger actuated hammer biased toward said poppet valve stem such that actuation of said hammer moves said poppet valve stem and head from a position closing said orifice to a position opening said orifice.

16. The valve system of claim 11, wherein said second portion of said housing surrounds an internal wall forming a forward wall of said venting chamber said wall also defining an aperture providing communication between said venting chamber and a spring well confining said biasing spring.

17. A valve system for releasing air to power a projectile in an air gun, the valve system comprising:
    a main valve body including a large diameter forward section terminating in a forward seal surface, and a reduced diameter rear section;
    a housing slidably receiving and surrounding said main valve body, such that a variable volume chamber is formed about said reduced diameter rear section of said main valve body and said housing, with said variable volume chamber being vented to atmosphere, said housing further including an enlarged portion forward of said first portion defining a propulsion chamber about said main valve body, said propulsion chamber having an exit orifice circumscribed by forward annular valve seat for engagement with said forward seal surface such that pressurized air may be confined between said main valve body and said enlarged portion when said valve seat is engaged with said forward seal surface
    said housing defining a venting chamber rearwardly of said main valve body;
    a small diameter valve operatively connected to said venting chamber for selective release of pressurized air within said venting chamber to atmosphere wherein said small diameter valve includes a valve face, said valve face normally biased to close a venting orifice connecting said venting chamber to atmosphere; and
    a biasing spring operatively positioned to urge said main valve body forwardly against said forward annular valve seat.

18. The valve system of claim 17 wherein said main valve body includes a restricted diameter air conduit extending radially into said large diameter section and axially rearwardly providing a passageway through said main valve body.

19. The valve system of claim 17, further comprising a trigger actuated hammer biased toward said valve face such that actuation of said hammer moves said valve face from a position closing said venting orifice to a position opening said venting orifice.

20. The valve system of claim 19, wherein said exit orifice communicates with a barrel of said air gun such that actuation of said hammer opens said venting orifice creating a pressure differential across said valve body and retraction of said valve body to release pressurized air into said barrel.

* * * * *